United States Patent
DeBusk et al.

(10) Patent No.: US 10,368,295 B2
(45) Date of Patent: Jul. 30, 2019

(54) UNMANNED AERIAL VEHICLE GUIDANCE AND COMMUNICATION DEVICE WITH SYSTEM AND METHOD

(71) Applicant: FreeFlight Systems, Inc., Irving, TX (US)

(72) Inventors: John DeBusk, Irving, TX (US); Timothy Taylor, Irving, TX (US); Michael Frazier, Irving, TX (US)

(73) Assignee: FreeFlight Systems, Inc., Irving, TX (US)

( * ) Notice: Subject to any disclaimer, the term of this patent is extended or adjusted under 35 U.S.C. 154(b) by 0 days.

(21) Appl. No.: 15/165,301

(22) Filed: May 26, 2016

(65) Prior Publication Data

US 2016/0353358 A1    Dec. 1, 2016

Related U.S. Application Data

(60) Provisional application No. 62/166,614, filed on May 26, 2015.

(51) Int. Cl.

| G05D 1/00 | (2006.01) |
|---|---|
| G05D 3/00 | (2006.01) |
| G06F 7/00 | (2006.01) |
| G06F 17/00 | (2019.01) |
| H04W 48/10 | (2009.01) |
| H04W 4/02 | (2018.01) |
| G01C 21/20 | (2006.01) |
| G05D 1/10 | (2006.01) |
| G08G 5/00 | (2006.01) |

(52) U.S. Cl.
CPC ............ *H04W 48/10* (2013.01); *G01C 21/20* (2013.01); *G05D 1/104* (2013.01); *G08G 5/0013* (2013.01); *G08G 5/0021* (2013.01); *G08G 5/0026* (2013.01); *G08G 5/0039* (2013.01); *G08G 5/0052* (2013.01); *G08G 5/0069* (2013.01); *H04W 4/02* (2013.01)

(58) Field of Classification Search
None
See application file for complete search history.

(56) References Cited

U.S. PATENT DOCUMENTS

| 5,187,810 | A | * | 2/1993 | Yoneyama | G01C 21/3492 340/905 |
|---|---|---|---|---|---|
| 5,548,515 | A | * | 8/1996 | Pilley | G01C 23/00 340/961 |
| 5,839,086 | A | * | 11/1998 | Hirano | G01C 21/26 340/988 |
| 6,064,941 | A | * | 5/2000 | Nimura | G01C 21/3682 340/988 |
| 6,278,396 | B1 | * | 8/2001 | Tran | G01S 13/9303 342/29 |
| 6,351,709 | B2 | * | 2/2002 | King | G01C 21/3492 340/990 |
| 6,538,581 | B2 | * | 3/2003 | Cowie | G08G 5/0086 340/961 |
| 6,683,541 | B2 | * | 1/2004 | Staggs | G01C 23/00 340/961 |

(Continued)

*Primary Examiner* — Abby Y Lin
*Assistant Examiner* — Kenny A. Taveras
(74) *Attorney, Agent, or Firm* — Polsinelli PC; Adam C. Rehm

(57) ABSTRACT

A communication device of a communication system to guide unmanned aerial vehicles.

18 Claims, 4 Drawing Sheets

(56) References Cited

U.S. PATENT DOCUMENTS

| | | | | |
|---|---|---|---|---|
| 7,437,225 | B1* | 10/2008 | Rathinam | G08G 5/0013 340/961 |
| 7,783,427 | B1* | 8/2010 | Woodell | G01S 7/003 340/961 |
| 9,087,451 | B1* | 7/2015 | Jarrell | G08G 5/0069 |
| 2001/0014849 | A1* | 8/2001 | King | G01C 21/3492 701/29.1 |
| 2003/0028323 | A1* | 2/2003 | Zeitler | G05D 1/0282 701/408 |
| 2008/0300737 | A1* | 12/2008 | Sacle | G01C 21/00 701/3 |
| 2009/0115637 | A1* | 5/2009 | Naimer | G01C 23/00 340/979 |
| 2012/0022776 | A1* | 1/2012 | Razavilar | G01C 21/3697 701/482 |
| 2014/0032034 | A1* | 1/2014 | Raptopoulos | G08G 5/0069 701/25 |
| 2014/0210646 | A1* | 7/2014 | Subramanya | B61L 29/28 340/928 |
| 2015/0120100 | A1* | 4/2015 | Sacle | G01C 21/20 701/18 |
| 2016/0138929 | A1* | 5/2016 | Komatsu | G01C 21/3461 701/533 |
| 2016/0353358 | A1* | 12/2016 | DeBusk | H04W 48/10 |

* cited by examiner

UNMANNED AERIAL VEHICLE GUIDANCE AND COMMUNICATION DEVICE WITH SYSTEM AND METHOD

CROSS-REFERENCE TO RELATED APPLICATION

This Patent Application claims priority to U.S. Provisional Patent Application Ser. No. 62/166,614 filed May 26, 2015 titled Unmanned Aerial Vehicle Guidance and Communication Device with System and Method, the entire contents of which is herein incorporated by reference in its entirety.

BACKGROUND

I. Technical Field

Aspects of the present disclosure relate to a communication device and, in particular, to a communication device of a communication system and method to guide unmanned aerial vehicles.

II. Discussion of Related Art

The use of unmanned aerial vehicles has increased dramatically over the past decade. Such increase presents multiple issues with respect to ensuring efficient operation and flight paths of such unmanned aerial vehicles and ensuring such unmanned aerial vehicles do not collide with any other unmanned or manned aerial vehicles, e.g., airplanes, any unmanned or manned non-aerial vehicles, and/or any other objects, e.g., stationary objects such as towers.

SUMMARY

The present inventive concept provides a vehicle guidance and communication system including a plurality of beaconing devices distributed in a geographic environment, e.g., a city, a state, a country, a continent, and or a planet. The system is configured to define one or more flight paths and to guide vehicles through the environment by transmitting flight path guidance data and/or other associated data between beaconing devices and vehicles traveling in the environment. The system is configured to redefine the one or more flight paths in real-time based on data received via a data source, such as, but not limited to the Internet, a municipal traffic database, accident data, emergency-broadcast data, weather data, other vehicle data, and/or the like. In this manner, traffic along a flight path can be rerouted, slowed, and/or stopped. It is foreseen that whether a vehicle is rerouted, slowed, and/or stopped may be based on a rule stored in a memory of the device and/or a vehicle. It is foreseen that whether a vehicle is rerouted, slowed, and/or stopped may be based on a location of the vehicle along the flight path and/or an intersection, and/or U-turn area along the flight path.

It is an object of the present inventive concept to provide a system operable to communicate via broadcasting one or more signals.

It is an object of the present inventive concept to facilitate communications between vehicles traveling in the environment.

It is an object of the present inventive concept to track a plurality of flight factors associated with a plurality vehicles traveling in an environment and provide guidance data to prevent the vehicles from colliding with each other and/or other obstacles in the environment.

The aforementioned may be achieved in an aspect of the present disclosure by providing a guidance communication system. The system may include a controller configured to manage data stored in a memory via a processor. The data may be configured to be updated via other data received via a receiver-transmitter. The data may be associated with at least one vehicle in an environment controlled by the controller. The system may include at least one beacon configured to (i) be remotely deployed in the environment of the controller, (ii) communicate with the transmitter-receiver of the controller via a beacon transmitter-receiver, and/or (iii) communicate with the vehicle via the beacon transmitter-receiver.

The at least one beacon may include a plurality of beacons remotely deployed in the environment of the controller to define a first path. The controller may be configured to broadcast guidance data to the vehicle in the environment via the plurality of beacons. The controller may be configured to communicate (i) directly with the vehicle via the receiver-transmitter, and/or (ii) indirectly with the vehicle via at least one of the plurality of beacons. The vehicle may be configured to communicate (i) directly with the controller via a vehicle receiver-transmitter, and/or (ii) indirectly with the controller via at least one of the plurality of beacons.

The at least one beacon may be configured to store data associated with an area of the environment in a proximity to the at least one beacon in a beacon memory. The data may be at geographic data, (ii) obstruction data, (iii) weather data, (iv) a minimum speed, a maximum speed and/or an exact speed, and/or (v) a minimum altitude, a maximum altitude and/or an exact. The beacon memory may include a plurality of rules associated with the data, and a plurality of commands each associated with one of the plurality of rules. The plurality of commands may be configured to cause the vehicle to (i) maintain a speed, a direction, and/or an altitude of the vehicle, (ii) increase a speed, a direction, and/or an altitude of the vehicle, and/or (iii) decrease a speed, a direction, and/or an altitude of the vehicle. The controller may be configured to set and/or change the plurality of rules.

The at least one beacon may be configured to detect (i) an event that occurs in a proximity to the at least one beacon, and/or (ii) a condition present in the proximity to the at least one beacon, and maintain a log of the event and/or the condition via a beacon memory. The at least one beacon may be configured to (i) transmit data associated with the event and/or the condition to the controller, (ii) identify a rule for the data associated with the event and/or the condition via a beacon processor and match the data to the controller, and/or (iii) transmit a command associated with the rule to the at least one vehicle. The command may be operable to affect at least one flight factor of the vehicle upon receipt of the command by the vehicle. The flight factor may be a speed, an altitude, or a direction of the vehicle.

Each of the plurality of beacons may be positioned at predetermined intervals with respect to each other to define a first path, each of the plurality of beacons spaced from each other based on a signal transmission range of each of the plurality of beacons. Each of the plurality of beacons is positioned to provide redundancy so that if one of the beacon goes offline or is compromised, an adjacent beacon can provide all functionality of the offline beacon including maintain a portion of a path of the offline beacon.

Each of the plurality of beacons may be positioned to define a first path. The first path may be (i) a virtual path for travel by the vehicle, and/or (ii) defined by the controller. The first path may be based on one or more second paths. The one or more second paths may be a road for ground vehicles, a water channel, e.g., a river, lake, or ocean, a pipe, e.g., an oil pipe, a gas pipe, a water pipe, a sewage pipe, and/or a utility line, e.g., an electricity line, a cable line, a phone line, an Internet line. The first path may be partially/entirely spaced from the ground and be positioned in airspace above and/or adjacent to the one or more second paths. The devices may be positioned at intervals along the one or more second paths. The first path may be in airspace above a median of a highway and/or above a water channel.

The receiver-transmitter may be configured to broadcast and receive a first signal. The first signal may be an automatic dependent surveillance-broadcast (ADS-B) signal. The receiver-transmitter may be configured to broadcast and receive a second signal. The second signal may be associated with the first signal. The first signal may contain critical safety of life data, and the second signal may contain other data. The vehicle may be an unmanned aerial vehicle (UAV) and/or a remotely piloted aircraft (RPA). The vehicle may be a drone. The system, e.g., via the processor and/or one or more beacons may be configured to produce or generate at least one virtual beacon or a plurality of virtual beacons in the environment. The one virtual beacon or each of the plurality of virtual beacons may be configured to be created, removed, relocated, and/or re-characterized in real time by the system, e.g., via the processor and/or the one or more beacons.

It is foreseen that the vehicle may function without any geo-specific programming or other similar data using the system of the present inventive concept. Rather, the vehicle may function entirely based on one or more rules, e.g., "universal rules," stored in a memory of the vehicle and/or communicated to the vehicle by the system. In this manner, a flight path of the vehicle may be at least partially or entirely dictated by the system. For instance, it is foreseen the system could communicate virtual beacons, e.g., "breadcrumbs," for the vehicle to follow when traveling through the environment.

It is foreseen that a beacon signal or beacon signals may be broadcast by the system rather than, for example, point-to-point communicated to the vehicle. In this manner, behavior of the vehicle is determined by rules stored in a memory of the vehicle and relative positions of the virtual beacons or breadcrumbs that the system generates or pops into space.

The aforementioned may be achieved in another aspect of the present disclosure by providing a communication beaconing device. The device may include a processor configured to manage data stored in a memory. The device may include a receiver-transmitter configured to receive data from and transmit data to at least one vehicle in an environment. The device may be configured to (i) be deployed in the environment, and/or (ii) define a first path for the vehicle in the environment using the data stored in the memory. The device may be configured to communicate independently receive and/or transmit a first signal and/or a second signal.

The at least one vehicle may include a plurality of vehicles. The device may be configured to independently receive and/or transmit a first signal and/or a second signal to each of the plurality of vehicles. The device may be part of a network of devices in the environment that cooperatively define the first path for the vehicle in the environment.

The first path may be at least partially spaced from a ground surface. The first path may be entirely spaced from a ground surface. The first path may include at least two adjacent lanes defined by the device to accommodate traffic traveling at an altitude and in different directions and/or at different speeds in a same direction. The two lanes may be spaced from each other by a median defined by the device. The median may include U-turn areas defined by the device that connect the at least two lanes. The U-turn areas may be spaced from each other along the median to change from one of the at least two lanes to another lane of the at least two lanes. The U-turn areas may allow the vehicle to change a flight factor.

The first path may include at least one entrance and at least one exit defined by the device along the first path to allow the vehicle to enter and exit the first path. Each of the at least two lanes may include a plurality of entrances and a plurality of exits defined by the device that correspond to each other to allow the vehicle to change between the at least two lanes. The device may be configured to provide data associated with an event and/or a condition (i) within a predetermined proximity to the device, and (ii) likely to affect an ability of the vehicle to travel along a portion of the first path. The data may be associated with the event and the event is at least one of (i) a compromised or offline adjacent beacon, (ii) inclement weather, (iii) a command.

The command may be transmitted by an administrator of a system of the device to cause traffic to stop or travel at a specified speed and/or altitude. The condition may be an obstruction at least partially in the first path. The obstruction may be associated with inclement weather or a traffic accident. The data may be associated with the condition.

The device may further include a unique identifier stored in the memory. The receiver-transmitter may be operable to broadcast a signal. The signal may be associated with an automatic dependent surveillance broadcast (ADS-B). The signal may be a plurality of signals with different bands, a Wi-Fi signal, and/or a radio signal. The receiver-transmitter may be operable to receive and transmit data from a user.

The device may further include a detector. The detector may be operable to detect a hazard, weather condition, e.g., inclement weather, a change in geography, e.g., a landslide, a forest fire, an earthquake, a volcano eruption, a flood, an accident, e.g., a traffic accident, tampering, and/or malware.

The device may be configured to (i) go offline, (ii) stop communicating with the vehicle, and/or (iii) transmit a warning to an administrator if a potential compromise is detected by the detector.

The memory may contain at least a portion of rules. The rules may be (i) stored at least partially in the device, (ii) stored at least partially in the vehicle, (ii) stored at least partially in a network of beacons, and (iv) distributed in a combination thereof. Each of the rules may be associated with at least one command configured to be executed by the vehicle and affect a travel factor of the vehicle.

The travel factor may be at least one of a speed, a direction, and an altitude. The speed may be between zero and one hundred miles per hour. The altitude may be between ground and ten thousand feet from a ground surface. At least one of the rules may be based on a geographic feature in a proximity to the device or an obstruction in the proximity to the device.

The beacon may be configured to produce or generate at least one virtual beacon or a plurality of virtual beacons in the environment. The one virtual beacon or each of the plurality of virtual beacons may be configured to be created, removed, relocated, and/or re-characterized in real time by the beacon, e.g., via a processor.

It is foreseen that the vehicle may function without any geo-specific programming or other similar data using the beacon of the present inventive concept. Rather, the vehicle may function entirely based on one or more rules, e.g., "universal rules," stored in a memory of the vehicle and/or communicated to the vehicle by the beacon. In this manner, a flight path of the vehicle may be at least partially or entirely dictated by the beacon. For instance, it is foreseen the beacon could communicate virtual beacons, e.g., "breadcrumbs," for the vehicle to follow when traveling through the environment.

It is foreseen that a beacon signal or beacon signals may be broadcast by the beacon rather than, for example, point-to-point communicated to the vehicle. In this manner, behavior of the vehicle is determined by rules stored in a memory of the vehicle and relative positions of the virtual beacons or breadcrumbs that the beacon generates or pops into space.

The aforementioned may be achieved in another aspect of the present disclosure by providing a method of guiding a vehicle using a communication system. The method may include the step of providing a controller configured to manage data stored in a memory via a processor, the data configured to be updated via other data received via a receiver-transmitter, the data associated with at least one vehicle in an environment controlled by the controller. The method may include the step of deploying at least one beacon configured to (i) be remotely deployed in the environment of the controller, (ii) communicate with the transmitter-receiver of the controller via a beacon transmitter-receiver, and (iii) communicate with the vehicle via the beacon transmitter-receiver.

The at least one beacon may include a plurality of beacons deployed in the environment of the controller to define a first path. The method may include the step of broadcasting guidance data to the vehicle in the environment via the plurality of beacons via the controller. The method may include the step of broadcasting guidance data, via the controller, (i) directly to the vehicle via the receiver-transmitter, or (ii) indirectly to the vehicle via at least one of the plurality of beacons.

The vehicle may be configured to communicate (i) directly with the controller via a vehicle receiver-transmitter, or (ii) indirectly with the controller via at least one of the plurality of beacons. The at least one beacon may be configured to store data associated with an area of the environment in a proximity to the at least one beacon in a beacon memory.

The data may be at least one of (i) geographic data, (ii) obstruction data, (iii) weather data, (iv) a minimum speed, a maximum speed and/or an exact speed, and (v) a minimum altitude, a maximum altitude and/or an exact. The beacon memory may include a plurality of rules associated with the data, and a plurality of commands each associated with one of the plurality of rules.

The plurality of commands may be configured to cause the vehicle to (i) maintain a speed, a direction, and/or an altitude of the vehicle, (ii) increase a speed, a direction, and/or an altitude of the vehicle, and/or (iii) decrease a speed, a direction, and/or an altitude of the vehicle.

The method may further include the step of causing a command to be transmitted from the beacon to the vehicle when an event or a condition is detected. The command may be effective to cause the vehicle to change a flight factor. The method may further include the step of causing a command to be transmitted from the beacon to the vehicle when an administrator sends data to the beacon.

Additional aspects, advantages, and utilities of the present disclosure will be set forth in part in the description which follows and, in part, will be obvious from the description, or may be learned by practice of the present disclosure.

The foregoing is intended to be illustrative and is not meant in a limiting sense. Many features and subcombinations of the present disclosure may be made and will be readily evident upon a study of the following specification and accompanying drawings comprising a part thereof. These features and subcombinations may be employed without reference to other features and subcombinations. The scope of the invention, however, shall be defined by the appended claims.

BRIEF DESCRIPTION OF THE DRAWINGS

Embodiments of the present disclosure are illustrated by way of example in which like reference numerals indicate similar elements and in which.

Figure 1:
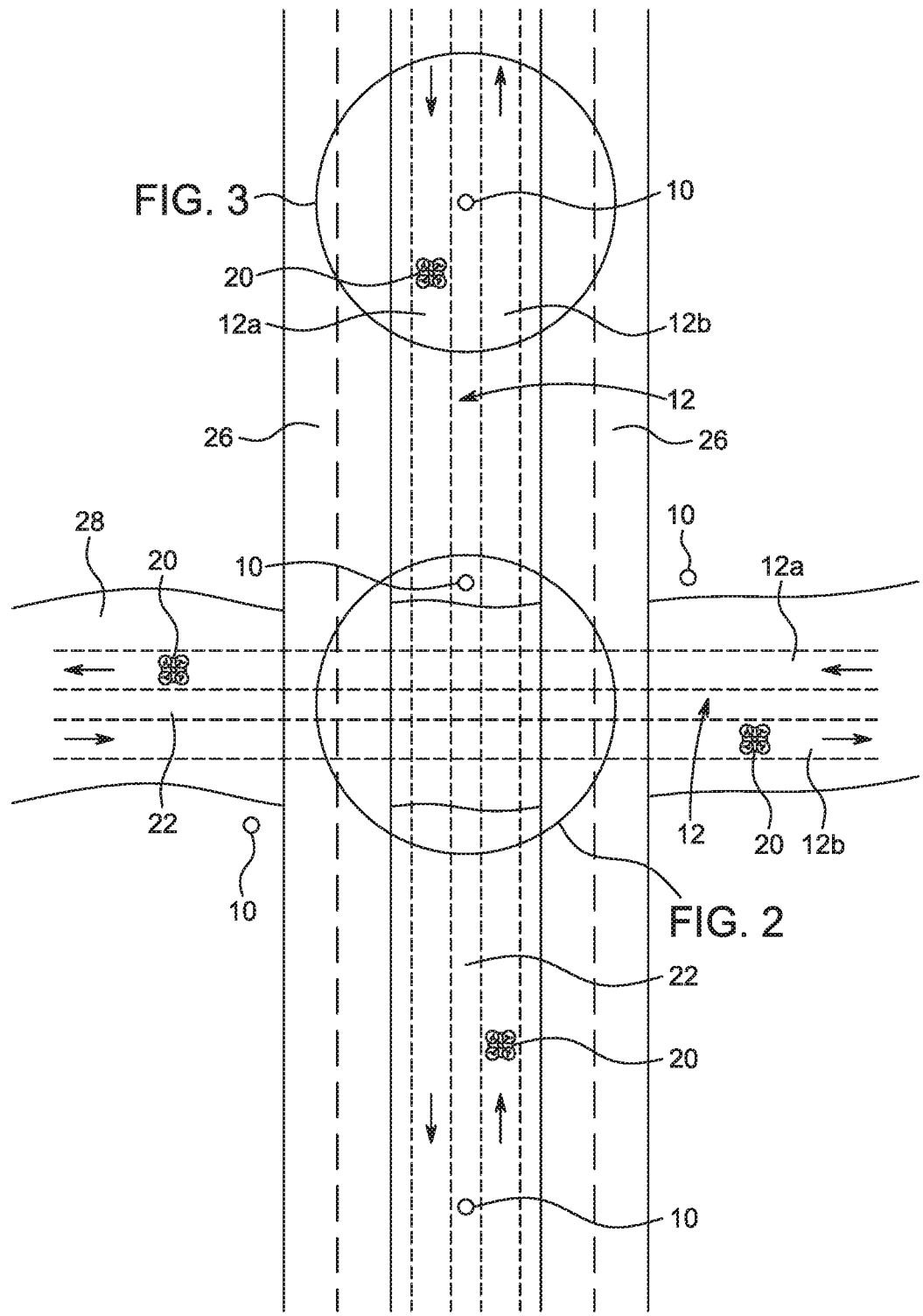
FIG. 1 illustrates an exemplary environment according to one embodiment of the present disclosure.
Figure 2:
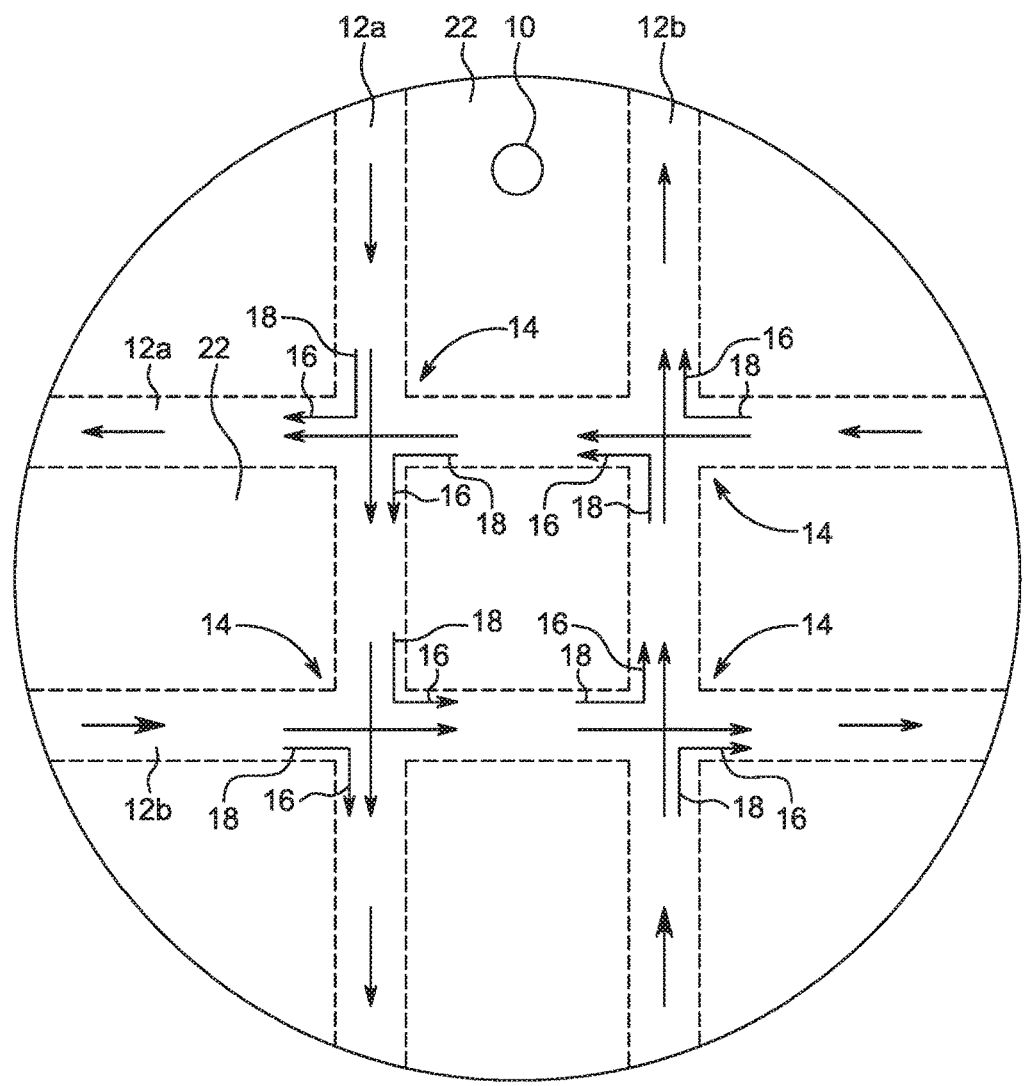
FIG. 2 illustrates a magnified portion of the environment illustrated in FIG. 1.
Figure 3:
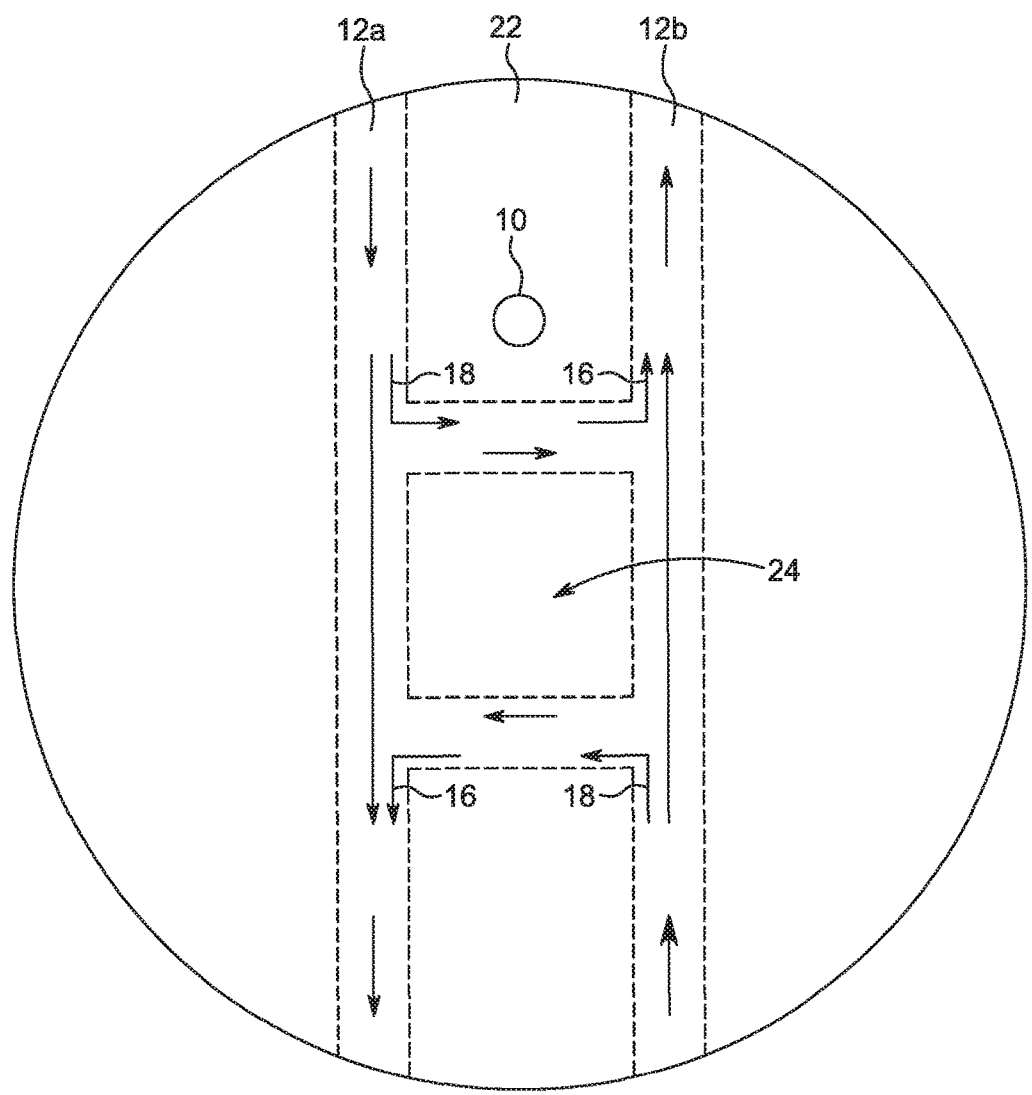
FIG. 3 illustrates another magnified portion of the environment illustrated in FIG. 1.
Figure 4:
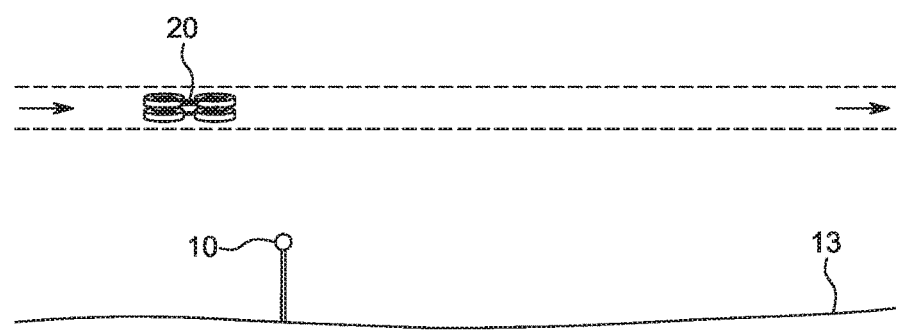
FIG. 4 illustrates another environment according to one embodiment of the present disclosure.

The drawing figures do not limit the present disclosure to the specific embodiments disclosed and described herein. The drawings are not necessarily to scale, emphasis instead being placed on clearly illustrating principles of certain embodiments of the present disclosure.

DETAILED DESCRIPTION

The following detailed description references the accompanying drawings that illustrate various embodiments of the present disclosure. The illustrations and description are intended to describe aspects and embodiments of the present disclosure in sufficient detail to enable those skilled in the art to practice the present disclosure. Other components can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

I. Terminology

In the following detailed description, terminology is used to describe features of the present disclosure. For example, references to terms "one embodiment," "an embodiment," or "embodiments" mean that the feature or features being referred to are included in at least one aspect of the present disclosure. Separate references to terms "one embodiment," "an embodiment," or "embodiments" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present disclosure may include a variety of combinations and/or integrations of the embodiments described herein. Additionally, all aspects of the present disclosure as described herein are not essential for its practice.

The terms "or" and "and/or" as used herein are to be interpreted as inclusive or meaning any one or any combination. Therefore, "A, B or C" or "A, B and/or C" mean any of the following: "A," "B," "C"; "A and B"; "A and C"; "B and C"; "A, B and C." An exception to this definition will occur only when a combination of elements, functions, steps or acts are in some way inherently mutually exclusive.

As the present disclosure is susceptible to embodiments of many different forms, it is intended that the present disclosure be considered as an example of the principles of the present disclosure and not intended to limit the present disclosure to the specific embodiments shown and described.

II. General Architecture

Turning to FIGS. 1-4, embodiments of the present disclosure provide a communication system and method to guide unmanned aerial vehicles in an environment. FIG. 1 illustrates an exemplary environment wherein a plurality of communication devices or beacons 10 are distributed to define a plurality of virtual paths 12 in the air and spaced from the ground 13. Each of the beacons 10 include a physical device with physical components and/or a virtual device placed along the plurality of paths 12, i.e., physically installed in and/or on the ground and along the plurality of paths 12 or virtually installed via the system, e.g., in a memory of the system.

Each of the plurality of paths 12 intersects each other or at least come within a certain proximity to each other, e.g., one hundred yards at virtual intersections 14. Each of the intersections 14 includes a virtual entrance 16 and a virtual exit 18 to allow an unmanned aerial vehicle 20, e.g., a drone, traveling along one of the plurality of paths 12 to travel between the plurality of paths 12. Each of the plurality of paths 12 has at least two virtual lanes 12a, 12b to accommodate travel in opposite directions and/or at different speeds by the vehicle 20. The two lanes 12a, 12b of may be spaced by a virtual median 22 and have virtual U-turn areas 24 at regular intervals therealong to allow the vehicle 20 to change a direction of travel and/or speed of travel. Each of the plurality of paths 12 is associated with and/or extends along and/or adjacent to at least one non-virtual or a physical, secondary path, e.g., a road 26 or a water channel 28.

The system includes a plurality of communication devices, e.g., signal repeaters broadcast from a primary communication device, operable to provide two-way communication with the vehicle, e.g., to communicate travel instructions and/or travel alerts to the vehicle 20, and/or obtain status information of the vehicle 20, e.g., a battery life. Each of the communication devices are installed along the plurality of paths 12, i.e., physically installed in and/or on the ground and within a certain proximity to each other to ensure constant communication with the vehicle 20 while the vehicle 20 is traveling along the plurality of paths 12. It is foreseen, however, that the plurality of communication devices may be further spaced from each other to provide non-constant communication, e.g., one or more non-communication zones where the vehicle 20 and the system are not able to communicate, and one or more communication zones where the vehicle 20 and the system are able to communicate.

Each of the communication devices are operable to communicate with the primary communication device, which is in communication with a controller having a memory, a processor, and input means to receive information for processing. Such information may include information regarding obstacles within or near the plurality of paths, e.g., airplanes, any unmanned or manned non-aerial vehicles, and/or any other objects, e.g., stationary objects such as towers. The system is operable to process such information and transmit instructions to the vehicle 20 to ensure efficient operation and flight paths of the vehicle 20 and ensure the vehicle 20 does not collide with any of the obstacles. The system is operable to store such information and such processed information in the memory.

The description above includes example systems, methods, techniques, commands, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic device) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

A machine readable medium includes any mechanism for storing or transmitting information in a form (e.g., software, processing application) readable by a machine (e.g., a computer). Such media may take the form of, but is not limited to, nonvolatile media and volatile media. Nonvolatile media includes optical or magnetic disks. Volatile media includes dynamic memory. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A guidance communication system comprising:
   a controller configured to manage flight path guidance data stored in a memory via a processor, the flight path guidance data configured to be updated via other data received via a receiver-transmitter, the flight path guidance data associated with at least one unmanned aerial vehicle in an environment controlled by the controller; and
   at least one beacon configured to (i) be remotely deployed in the environment of the controller to define a flight path of the vehicle by transmitting the flight path guidance data to the vehicle, (ii) communicate with the receiver-transmitter of the controller via a beacon transmitter-receiver, and (iii) communicate with the vehicle via the beacon transmitter-receiver,
   wherein,
      the flight path includes a plurality of virtual lanes defined at least in part by the controller,
      each of the plurality of virtual lanes has a direction of travel defined by the controller,
      the plurality of virtual lanes include two adjacent lanes with opposite directions of travel defined by the controller,
      the at least one beacon includes a plurality of beacons deployed in the environment of the controller to define at least a portion of the flight path,
      each of the plurality of beacons spaced from each other at predetermined distances to provide redundancy such that, when one of the plurality of beacons is offline, one adjacent beacon maintains an adjacent portion of the flight path previously maintained by the one of the plurality of beacons that is offline, and
   the adjacent portion of the flight path previously maintained by the one of the plurality of beacons that is offline is entirely maintained by only the one adjacent beacon so that all functionality of the offline beacon is maintained by the one adjacent beacon.

2. The guidance communication system of claim 1, wherein the controller is configured to broadcast the flight path guidance data to the vehicle in the environment via the plurality of beacons.

3. The guidance communication system of claim 1, wherein the controller is configured to communicate (i) directly with the vehicle via the receiver-transmitter, or (ii) indirectly with the vehicle via at least one of the plurality of beacons.

4. The guidance communication system of claim 1, wherein the vehicle is configured to communicate (i) directly with the controller via a vehicle receiver-transmitter, or (ii) indirectly with the controller via at least one of the plurality of beacons.

5. The guidance communication system of claim 1, wherein the at least one beacon is configured to store the flight path guidance data associated with an area of the environment in a proximity to the at least one beacon in a beacon memory.

6. The guidance communication system of claim 5, wherein the flight path guidance data is at least one of (i) geographic data, (ii) obstruction data, (iii) weather data, (iv) a minimum speed, a maximum speed and/or an exact speed, and (v) a minimum altitude, a maximum altitude and/or an exact.

7. The guidance communication system of claim 6, wherein the beacon memory includes a plurality of rules associated with the flight path guidance data, and a plurality of commands each associated with one of the plurality of rules.

8. The guidance communication system of claim 7, wherein the plurality of commands are configured to cause the vehicle to (i) maintain a speed, a direction, and/or an altitude of the vehicle, (ii) increase a speed, a direction, and/or an altitude of the vehicle, and/or (iii) decrease a speed, a direction, and/or an altitude of the vehicle.

9. The guidance communication system of claim 1, wherein the at least one beacon is configured to detect (i) an event that occurs in a proximity to the at least one beacon, and/or (ii) a condition present in the proximity to the at least one beacon, and maintain a log of the event and/or the condition via a beacon memory.

10. A method of guiding a vehicle using a communication system, the method comprising the steps of:
    providing a controller configured to manage flight path guidance data stored in a memory via a processor, the flight path guidance data configured to be updated via other data received via a receiver-transmitter, the flight path guidance data associated with at least one unmanned aerial vehicle in an environment controlled by the controller; and
    deploying at least one beacon configured to (i) be remotely deployed in the environment of the controller to define a flight path of the vehicle by transmitting the flight path guidance data to the vehicle, (ii) communicate with the receiver-transmitter of the controller via a beacon transmitter-receiver, and (iii) communicate with the vehicle via the beacon transmitter-receiver,
    wherein,
       the flight path includes a plurality of virtual lanes defined at least in part by the controller,
       each of the plurality of virtual lanes has a direction of travel defined by the controller,
       the plurality of virtual lanes include two adjacent lanes with opposite directions of travel defined by the controller,
       the at least one beacon includes a plurality of beacons deployed in the environment of the controller to define at least a portion of the flight path,
       each of the plurality of beacons spaced from each other at predetermined distances to provide redundancy such that, when one of the plurality of beacons is offline, one adjacent beacon maintains an adjacent portion of the flight path previously maintained by the one of the plurality of beacons that is offline, and
    the adjacent portion of the flight path previously maintained by the one of the plurality of beacons that is offline is entirely maintained by only the one adjacent beacon so that all functionality of the offline beacon is maintained by the one adjacent beacon.

11. The method of claim 10, further comprising the step of:

broadcasting the flight path guidance data to the vehicle in the environment via the plurality of beacons via the controller.

12. The method of claim 10, further comprising the step of:
broadcasting the flight path guidance data, via the controller, (i) directly to the vehicle via the receiver-transmitter, or (ii) indirectly to the vehicle via at least one of the plurality of beacons.

13. The method of claim 10, wherein the vehicle is configured to communicate (i) directly with the controller via a vehicle receiver-transmitter, or (ii) indirectly with the controller via at least one of the plurality of beacons.

14. The method of claim 10, wherein the at least one beacon is configured to store the flight path guidance data associated with an area of the environment in a proximity to the at least one beacon in a beacon memory.

15. The method of claim 14, wherein the flight path guidance data is at least one of (i) geographic data, (ii) obstruction data, (iii) weather data, (iv) a minimum speed, a maximum speed and/or an exact speed, and (v) a minimum altitude, a maximum altitude and/or an exact.

16. The method of claim 15, wherein the beacon memory includes a plurality of rules associated with the data, and a plurality of commands each associated with one of the plurality of rules.

17. The method of claim 16, wherein the plurality of commands are configured to cause the vehicle to (i) maintain a speed, a direction, and/or an altitude of the vehicle, (ii) increase a speed, a direction, and/or an altitude of the vehicle, and/or (iii) decrease a speed, a direction, and/or an altitude of the vehicle.

18. The method of claim 17, wherein the controller is configured to set and/or change the plurality of rules.

* * * * *